Aug. 16, 1960  W. A. HANSON  2,948,966
DRIER
Filed Sept. 29, 1958

INVENTOR.
WILLIAM A. HANSON
BY George R. Bliss
Attorney

United States Patent Office 2,948,966
Patented Aug. 16, 1960

2,948,966
DRIER

William A. Hanson, 6178 Sepulveda Blvd., Van Nuys, Calif.

Filed Sept. 29, 1958, Ser. No. 763,929

6 Claims. (Cl. 34—1)

This invention relates to automatically controlled dehydrating equipment. It relates particularly to automatically controlled driers used for the dehydration of materials of a chemically unstable character which are changed in their chemical composition when subjected to relatively low temperatures in excess of 120° F. Many pharmaceutical products and components of pharmaceutical products are of such character. While the invention is of primary utility in this field, it also is applicable to advantage in the general field of dehydration.

It provides for the production of a dehydrated product of constant moisture content. It is reliable, economical, and sensitively accurate in its operation. Among the objects of the invention, therefore, may be listed protection of thermally unstable materials from overheating during dehydration, accurate control of the degree of dehydration at a point of predetermined percentage of moisture content, simplicity of construction, economy of operation, adaptability to readily available sources of power, high sensitivity, uniformity of product, and completely automatic operation, reducing to a minimum the need for skilled operating personnel.

While the principles of the invention are capable of application to many types of driers, it is best suited to the continuously operating driers, in which the material is fed at a substantially uniform rate to a moving carrier. It is particularly adaptable to the type of drier characterized by the conventional stainless steel revolving drum, operating either at atmospheric pressure or at subatmospheric pressure within a vacuum chamber. It will be described herein as embodied in a vacuum drum drier.

In the drawings, which are for illustrative purposes only:

Figure 2:
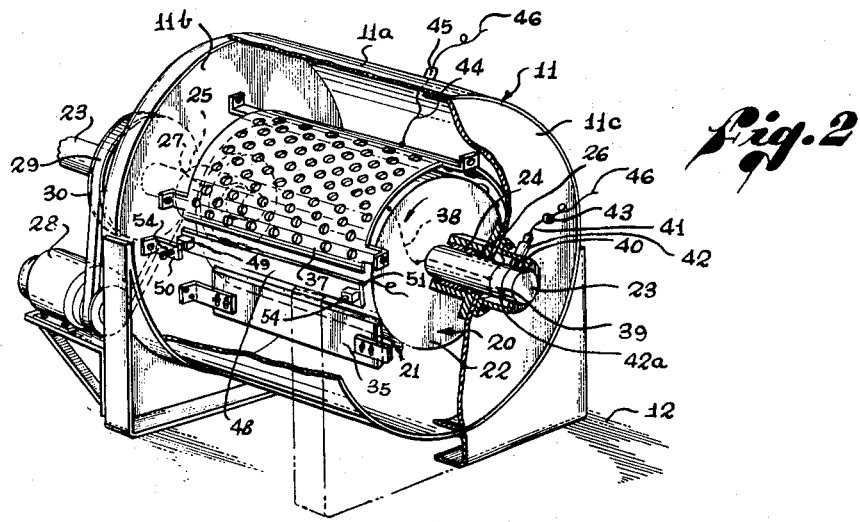
Figure 2 is a perspective view of the drier shown in Figure 1, showing additionally the motor drive for the drum and with the vacuum chamber shown with its walls partially cut away.
Figure 1:
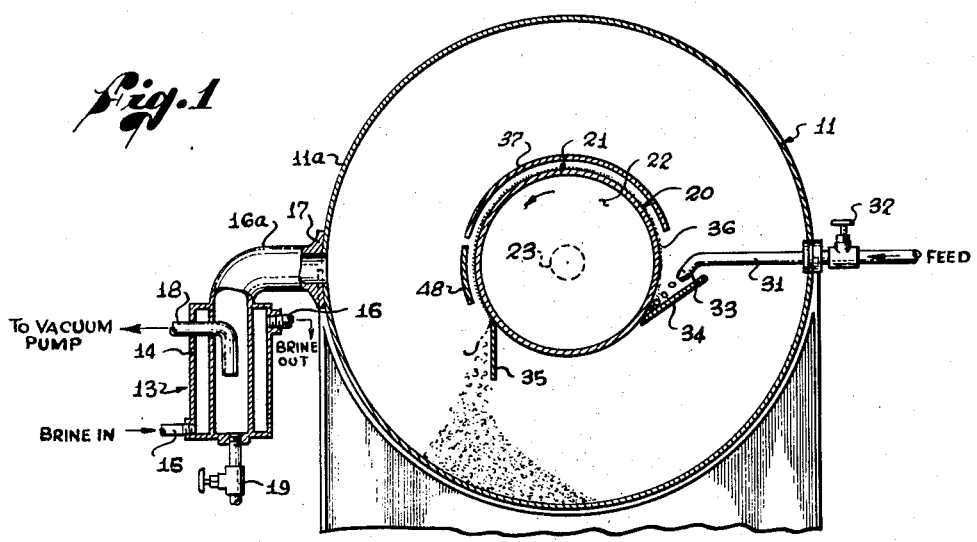
Figure 1 is a transverse section, partially schematic, of a vacuum drier embodying the invention.

A preferably cylindrical vacuum chamber structure 11 is suitably mounted on the floor 12. The vacuum is maintained by a conventional vacuum pumping apparatus comprising a vacuum pump (not shown), a condenser 13, and their connecting conduits. A cooling medium such as brine, is circulated in the jacket 14 of the condenser 13, entering through the inlet 15 and discharging through the outlet 16. The chamber of the condenser 13 is connected to the vacuum chamber 11 by a conduit 16a which communicates with the interior of the vacuum chamber through a gas tight joint 17 in the wall 11a of the vacuum chamber. The condenser chamber is connected to the vacuum pump by a conduit 18. A valve controlled drain 19 serves to remove the condensate from the condenser chamber.

A drum 20 is mounted within the vacuum chamber 11. This drum comprises a hollow metal cylinder 21 and end disc plates 22. The drum is mounted on alined shafts 23, which are revolvably supported by bearings 24 and 25 stationarily mounted on the end walls 11b and 11c of the vacuum chamber. The shafts 23 have fluid tight sealing joints 26 and 27 where they pass through the end walls 11b and 11c. The cylinder 21 is electrically insulated from the shaft 12 by its end plates 22 which are made of an insulating material, preferably a plastic such as Lucite, Bakelite, Transite or the like.

The drum is rotatably driven by a motor 28, driven belt 29, and pulley 30 on the shaft 23. The normal motor speed and speed ratio of the driving mechanism is such as to rotate the drum 20 at a low speed, as for instance 5 r.p.m. The material to be dried is introduced into the vacuum chamber 11, by a conduit 31 which has a regulating valve 32 and a discharge nozzle 33. The moist material to be dried drops on a spreader 34 from which it is picked up on the outer surface of the revolving drum 20. The direction of rotation of the drum is such as to take the material in a thin film or layer 36 upwardly, and across the top of the drum and thence downwardly to an electrically insulated scraper 35, which separates the layer from the surface of the drum. It is thereafter removed from the vacuum chamber by any suitable means (not shown) as a finished product or for further processing, as the case may be.

As the film of material 36, on the drum moves from the spreader 34 to the scraper 35, the moisture content of the material is evaporated into the vacuum chamber by heat from the cylinder wall of the drum. The wall may be practicably heated in anyone of several ways.

It is common practice to heat it by steam introduced into the drum interior, usually by providing the shaft with a hollow core into which the steam is injected through a fluid tight joint at a point on the hollow shaft outside of the vacuum chamber, with condensate drained from the opposite end portion of the hollow shaft in a fluid tight joint. Or the drum wall may be heated electrically by passing an electric current through the wall from end to end, utilizing the drum wall as a low resistance path for the current, suitable terminals and connections to a source of current being provided for this purpose. Or electric heating coils may be mounted within the drum and energized by suitable connections to a source of current.

Herein is described and illustrated still another method of heating the drum cylinder wall. This last mentioned method utilizes electric energy and is preferred because some of the apparatus required for it, is also required for the practice of this invention as will presently appear. It is to be understood, however, that the apparatus and principles of this invention may be combined with other methods of heating the drum wall, as well as with those outline above.

Figure 3:
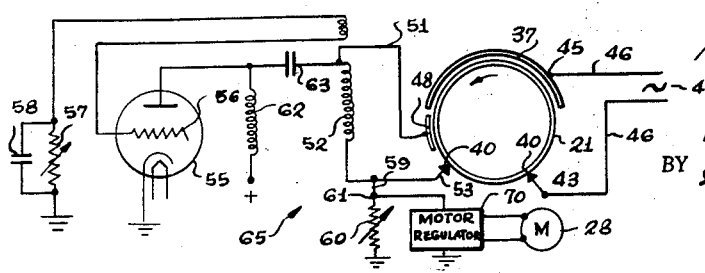
Figure 3 shows a diagram of electrical equipment which is part of the embodiment of the invention.

According to this last mentioned method of heating the drum cylinder wall, radio high frequency alternating current is transmitted between the cylinder drum wall 21 and a stationarily mounted concavoconvex foraminous plate 37 secured to the end walls 11b and 11c and concentrically related to the drum wall and spaced at a small substantially constant interval outside the drum wall. The drum wall and plate thus become a condenser coupling in the RF circuit. As above stated the drum wall is insulated from the metallic elements of its mounting by the di-electric end plates 22. It is connected to the source of the radio frequency current by conductor 38 leading from the drum wall to the shaft 23, hence along the shaft to the slip ring 39 and brush 40. Brush 40 is connected by conductor 41 leading by means of an insulated bushing 42 in a projecting hub 42a on the wall 11a of the vacuum chamber 11 to a terminal 43 which is available for connection to the source of RF energy 47, in circuit 46 as shown in Figure 3.

The plate 37, the other element of the coupling, is connected by conductor 44 through the wall 11a of the vacuum chamber 11 to a terminal 45 which is also available for connection to the source of RF energy, 47 in circuit 46.

The vacuum drier has an advantage in that it dries the materials in a relatively short time at the reduced temperatures at which solvent liquids will evaporate under the low pressure conditions of a vacuum chamber. These low temperatures will not deleteriously affect the solids of the material. However if the drum were maintained constantly at the temperature of vaporization of the solvent of the material being dried, the time for drying would be unduly prolonged due to the absence of any substantial temperature differential between the drum temperature and the temperature of the material as the vaporization process neared completion. The greater the temperature differential, the more rapid is heat transfer and hence the drying action.

For example under a pressure of 5 to 12 millimeters, the solvent water vaporizes at about 100 degrees F. Drying at this drum temperature would require an excessively long period of time. If internally heated then, for economy of operation a much higher drum temperature, for example of 200 to 300 degrees F., should be maintained. As long as the layer of water moistened product on the drum is not entirely dry, its temperature, due to the heat of vaporization, will not exceed the temperature of vaporization, even though the drum is at a substantially higher temperature. Under the conditions of this example, then, until it is entirely dry, a product which is not harmed by temperatures somewhat greater than 100 degrees F. but not higher than, for example 200 degrees F., may be safely left on the drum for a very brief interval, depending upon the damaging temperature and the drum temperature. If the temperature at which damage occurs is slightly over 100 degrees F. obviously it must be removed at the instant the layer of material is entirely dry.

For assured safety in most drying operations the material should be scraped from the roller at the exact moment of minimum moisture. Otherwise it is almost certainly either damaged by the higher drum temperature, which destroys valuable enzymes and thermolabile vitamins, if the material is of that nature or is still damp upon removal requiring subsequent supplementary drying as by tray or dessicant drying, both of which are damaging to vitamins and enzymes by oxidation and/or enzymatic processes.

Thus practice has shown that if the vacuum drier is to be practicable with such labile enzyme and vitamin preparations, constant supervision by experienced personnel is necessary to control the drying operation by adjusting the drum roller speed or the temperature of the drum to the end that the product is removed at exactly the right moment of low liquid content predetermined as desirable for further disposition or processing of the material. This constant supervision is the more necessary because of the probable variation of the liquid content of the material as it is fed to the drum, from batch to batch or even in the same batch. This supervision is sufficiently expensive that it has tended to promote the use of spray driers, which, although they subject the product to dangerously high temperatures, difficult to control and handle, are more popular, because they lend themselves to the production of products of consistent character with less of the expensive skilled labor involved in control work.

In a drier constructed in accordance with this invention one, or two, or all three of the three factors determining the time period of the drying action, are varied automatically by a servo-control system to the end that the material being dried, when scraped from the drum as it reaches the scraper knife, is exactly at the point of minimum liquid content at which the material has absorbed all of the latent heat of vaporization of its original liquid content and the temperature of the dry material is about to rise at a more rapid rate toward the temperature of the drum. These three factors are the speed of rotation of the drum, the temperature of the drum, and the rate of delivery of the material to the drum. The servo-control system of this invention has a sensing element and control means for varying any one or more of these three factors, of which the action is triggered by the sensing element. Control of the first factor, the speed of the drum, is probably the most effective and satisfactory. Control of the second factor, the temperature of the drum is second in importance. Control of the third factor, the rate of delivery of material to the drum is of least importance, and most likely to cause "hunting" due to the time lag between the sensing of the moisture content and the time of delivery of the material to the drum. Whether to utilize control of any one, or two, or all three of the factors depends upon the character of the drying operation and the accompanying conditions.

For the application of control of any one or more of these three factors affecting the drying operation, it is necessary to measure the moisture content of the material during the drying process. To do this, a "sensing" device is needed. Since the objective of the drying operation is usually to have the material at its minimum liquid holding capacity as it is being scraped or otherwise separated from the rotating drum or other moving drying surface, the sensing device is preferably located a short distance in advance of the scraper or other means for removing it from the heated drum. Under some conditions it may be desirable to mount the sensing device adjustably so that the time lag between the moving of the material past the sensing device and the scraper may be regulated to eliminate "hunting" in the operation of the automatic control.

As shown in the drawing, the sensing device consists of a high frequency oscillator 65 of conventional character which measures the degree of moisture in the drying material prior to its removal from the drum and converts this information into a voltage signal that instantly increases or decreases one or more of the potentially variable three factors governing the drying operation, i.e. the speed of the drum, the temperature of the drum and the rate of feed of the material to the drum. A relatively narrow metal strip 48 extending the length of the drum 20, is mounted on blocks 49, one at each end of the drum, which are secured in stationary position to brackets 50 which are rigidly secured to the end walls 11b and 11c. The strip 48 is preferably cylindrical in transverse section with a curvature concentric with that of the drum cylinder 21. It is insulated from its supporting blocks 49 and is connected by a conductor 51 to one terminal of an inductance coil 52 (see Figure 3), the other terminal of which is connected by conductor 53 to the drum cylinder 21 through brush 40 and slip ring 39.

The strip 48 and drum cylinder 21 thus become the two plates of a coupling condenser. These plates may be very close together, e.g. ¼ of an inch apart, the gap between them being made variable by the use of adjusting screws 54 in the fastening attachments securing the blocks 49 to the brackets 50. The inductance coil 52 and the strip 48 and drum cylinder 21 constitute the tank circuit of the conventional low power high frequency oscillator circuit 65 which is the sensing circuit of the servo-control system.

As shown in Figure 3, the oscillator also comprises the triode tube 55, of which the grid 56 is inductively linked with the inductance coil 52 and grounded through a manually adjustable resistor 57 and condenser 58 in parallel with the resistor, and further comprises an output connection 59 leading across variable load resistor 60 and through terminal 61 to some device operated by electrical energy and to ground. At a given fixed frequency of the tank circuit, a preset bias appears at the grid of the tube. The bias is preset by adjustment of the variable resistor 57. This grid bias then produces a fixed value of plate current through the tube and through resistor 60. Elements 62 and 63 designate respectively the usual radio frequency protecting choke coil and blocking capacitor to prevent the RF current shorting to ground through the power supply.

The voltage drop across resistor 60 varies with the percentage of moisture of the layer of material on the drum cylinder as this layer passes between the drum cylinder 21 and sensing plate 48; for the variation in the moisture content changes the di-electric (the layer of material) in the gap between the cylinder and plate, which changes the frequency of the oscillator which changes the flow of plate current, which effects a change in the voltage across resistor 60.

This varying voltage across resistor 60 can then be used to control the speed of the motor 28 by any one of several methods, none of which are specifically illustrated on the drawing because of their well known character and because they are interchangeable with one another in the combination of elements constituting this invention. The voltage difference signal may be amplified and then used to vary the output of a grid controlled gas tube, and so vary the voltage of the current supplied to a direct current motor and so vary its speed. The amplified signal may be used to vary the slippage of an electromagnetic clutch drive on the motor, or to vary the tension on a variable pulley to increase or decrease its diameter and consequently decrease or increase the speed of the drum 20. Or the amplified signal may be used to vary the direct current input to a magnetic amplifier variable impedance, and use the varying impedance to change the voltage impressed across a repulsion motor, whose speed varies with the voltage. The motor speed control devices are indicated generically by the reference numeral 70 on the drawing.

As was described above in mentioning the several possible means of heating the drier, the material may be heated and dried by the use of high frequency energy, the drum cylinder 21 being one condenser plate, and the concentrically mounted plate 37 acting as the other plate, of a condenser coupling in circuit 46 in Figure 3 of the drawing. The varying voltage across the load resistor 60 of the sensing system may be used to vary the power input of such a circuit 46 by control of the plate supply of this high frequency energy. This control of the supply of high frequency energy from circuit 46 is preferably used in conjunction with the control of the speed of the motor 28, rather than as the sole control of the drying action. It increases the sensitivity of the drier control by motor speed alone.

The frequency used in the moisture sensing circuit may be above 1 megacycle, although lower radio frequencies are also effective. The frequency of the heating circuit 46, when employed to heat the drum cylinder, may be used as the frequency of the sensing circuit.

The signal from the sensing element may also be used to govern the third factor affecting the drying operation, i.e. the rate of feed of the material. This may be done for example by providing an electromagnetic valve at 32 and providing means for controlling this valve 32 by the sensing signal. Such a method of controlling the drier is inferior to that of regulating the speed of the motor or of regulating the application of RF energy or other forms of electrical energy to the drum cylinder. The time lag between valve 32 and the sensing plate 48 is too great for steady, even control, without excessive fluctuation in the drying rate. As an emergency control, however, in the event of an excessive feed rate or the feeding of a portion of unusually wet material, with resultant overtaxing of the capacity of the motor at maximum speed, means can be provided by which the sensing signal at a predetermined high voltage differential, acts to operate the valve 32 to cut down the rate of feed of the material, thus avoiding the deposit of wet material on an accumulated mass of properly dried material.

In the practice of the invention the drum chamber is evacuated and the drum brought up to proper operating temperature by whatever heating means are employed. The drum drive is then started at a medium speed determined by experiment to be in the range necessary for proper drying time, usually in the range of from three to ten revolutions per minute. The material to be dried is then fed to the drier by opening the valve 32 and the motor speed is regulated by manual regulation of the variable resistor 60 until the product when scraped from the drum is at the desired moisture level, which is usually at the level of minimum moisture content (1% to 5%) of the material being dried. The oscillator circuit 65 then takes over and governs the drum speed to maintain the moisture level of the material as it leaves the drum at the desired constant value.

If in the practice of the invention the drum, or in lieu of a drum, a conveyer of any other kind, is heated and the material on the drum heated therefrom by conduction, and if the servo-control is used to govern the speed of movement of the drum or conveyer, a high temperature differential between drum and material can be maintained for rapid drying without danger of overheating the material to the point of damage thereto. If on the other hand the material on the drum is heated by the passage of radio frequency energy between the drum acting as a condenser plate and another condenser plate mounted close to the drum, and the servo-control is used to govern the speed of the drum, there is then no significant temperature differential between the drum and the material, and the servo-control regulates the speed of travel of the motor and thus regulates the speed of moisture removal by the radio frequency energy so that the material is at the desired dry condition at the removal station. It thus enables the motor to travel at the highest speed consonant with that desired result.

In the first case the servo-control operates to permit rapid drying by a high temperature differential without danger of overheating the material. In the second case the servo-control maintains the drum speed at a maximum and the time period of the drying at a minimum without delivering wet material. In either case the servo-control compensates for variations in the moisture content of the material delivered, variation in its rate of delivery to the drum, and in the intensity of the heat application.

The invention may have various embodiments coming within its scope and is not to be limited to any particular embodiment described and shown herein. It is to be given the scope of the definitive language of the appended claims.

I claim:

1. In a drier, the combination of: a cylindrical metallic drum; a variable speed power drive for said drum; means for heating the drum at a substantially constant rate of heat energy application; means for loading the material to be dried on one side of the drum; means for removing the material from the other side of the drum, the drum being capable of rotation with its outer surface travelling from the loading side to the removal side; a metal sheet of a relatively narrow width mounted at a small radial interval from the drum between the said loading and removal points; and a moisture sensing apparatus consisting of a low power, radio frequency oscillator, the said drum and metal sheet being included as a capacitor in the output circuit of said oscillator and the variable load output of said oscillator being the signal means of the sensing system and being connected to vary the speed of said variable speed power drive in inverse ratio to the moisture content of the material as it passes between said drum and metal sheet.

2. The combination defined in claim 1, and in addition thereto: a structure providing a vacuum chamber, within which said drum and metal sheets are mounted.

3. The combination defined in claim 1, and in addition thereto: a source of radio-frequency energy; a second metal sheet of relatively greater width than the sheet of narrow width mounted concentrically of the drum at a small radial interval therefrom, the drum and second sheet being electrically connected to the source of radio-frequency energy so as to act as a capacitor in the circuit of said radio frequency energy; and also in addition thereto, means for varying the rate of application of the radio frequency energy derived from said source to the di-electric gap between the drum and the second plate, and in which the said signal means is connected to actuate said means for varying the rate of application of radio-frequency energy, in direct ratio to the moisture content signal.

4. The combination defined in claim 1, and in addition thereto: a source of radio-frequency energy; a foraminous second metal sheet of relatively greater width than the sheet of narrow width mounted concentrically of the drum at a small radial interval therefrom, the drum and second sheet being electrically connected to the source of radio-frequency energy so as to act as a capacitor in the circuit of said radio frequency energy; and also in addition thereto: means for varying the rate of application of the radio frequency energy derived from said source to the di-electric gap between the drum and the second plate, and in which the said signal means is connected to actuate said means for varying the rate of application of ratio-frequency energy, in the direct ratio to the moisture content signal; and in further addition thereto: a structure providing a vacuum chamber within which said drum and metal sheets are mounted.

5. In a drier the combination of: a cylindrical metallic drum; a variable speed power drive for said drum; means for loading the material to be dried at a station on one side of the drum; means for removing the material from the drum at a station on the other side of the drum, the drum being capable of rotation with its outer surface traveling from the loading station to the removal station; a source of radio frequency energy; a relatively broad first metal sheet mounted concentrically of the drum at a small radial interval therefrom and circumferentially between the loading and removal stations of the drum, the drum and first sheet being electrically connected to the source of radio-frequency energy so as to act as a capacitor in the circuit of said radio frequency energy; a second metal sheet of relatively narrow width mounted at a small radial interval from the drum between the loading and removal stations of the drum and immediately prior to the removal station; a moisture sensing apparatus consisting of a low power, radio frequency oscillator, the said drum and second metal sheet being included as a capacitor in the output circuit of said oscillator and the variable load output of said oscillator being the signal of the sensing apparatus and being connected to vary the speed of the variable speed motor drive in inverse ratio to the moisture content of the material as it passes between said drum and second metal sheet.

6. The combination defined in claim 1, in which the means for loading the material is adjustable to vary the loading rate per unit of time, and in which the said signal is additionally connected to the loading means to adjust the said rate of loading in inverse ratio to the moisture content signal when said signal exceeds a predetermined relatievly high load output.

References Cited in the file of this patent
UNITED STATES PATENTS

| | | |
|---|---|---|
| 1,167,029 | Stickle | Jan. 4, 1916 |
| 2,311,673 | Lilja | Feb. 23, 1943 |
| 2,535,027 | Anderson | Dec. 26, 1950 |
| 2,602,594 | Hesse | July 8, 1952 |
| 2,880,523 | Overton | Apr. 7, 1959 |